United States Patent Office 3,717,022
Patented Feb. 20, 1973

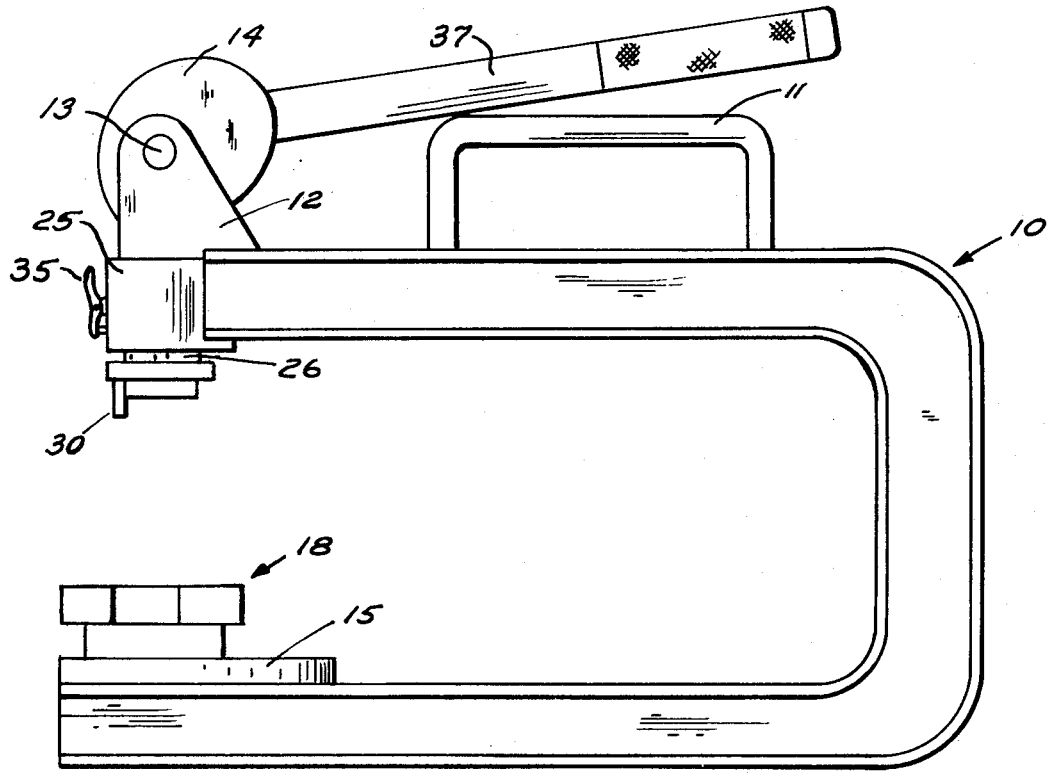
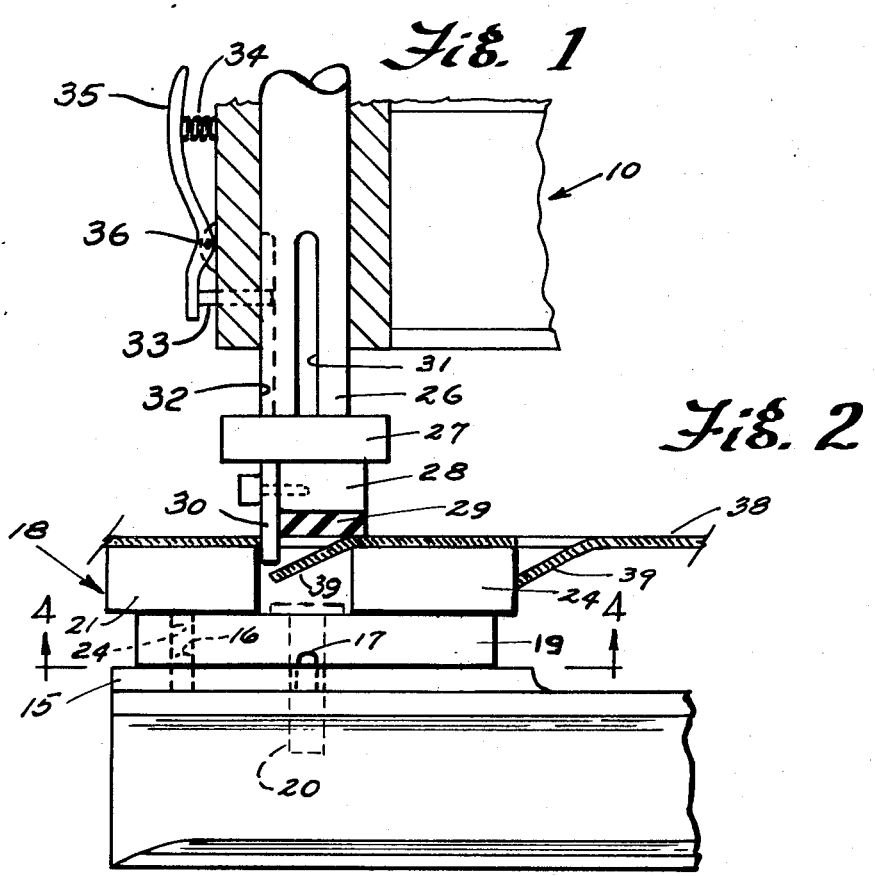
Fig. 1
Fig. 2

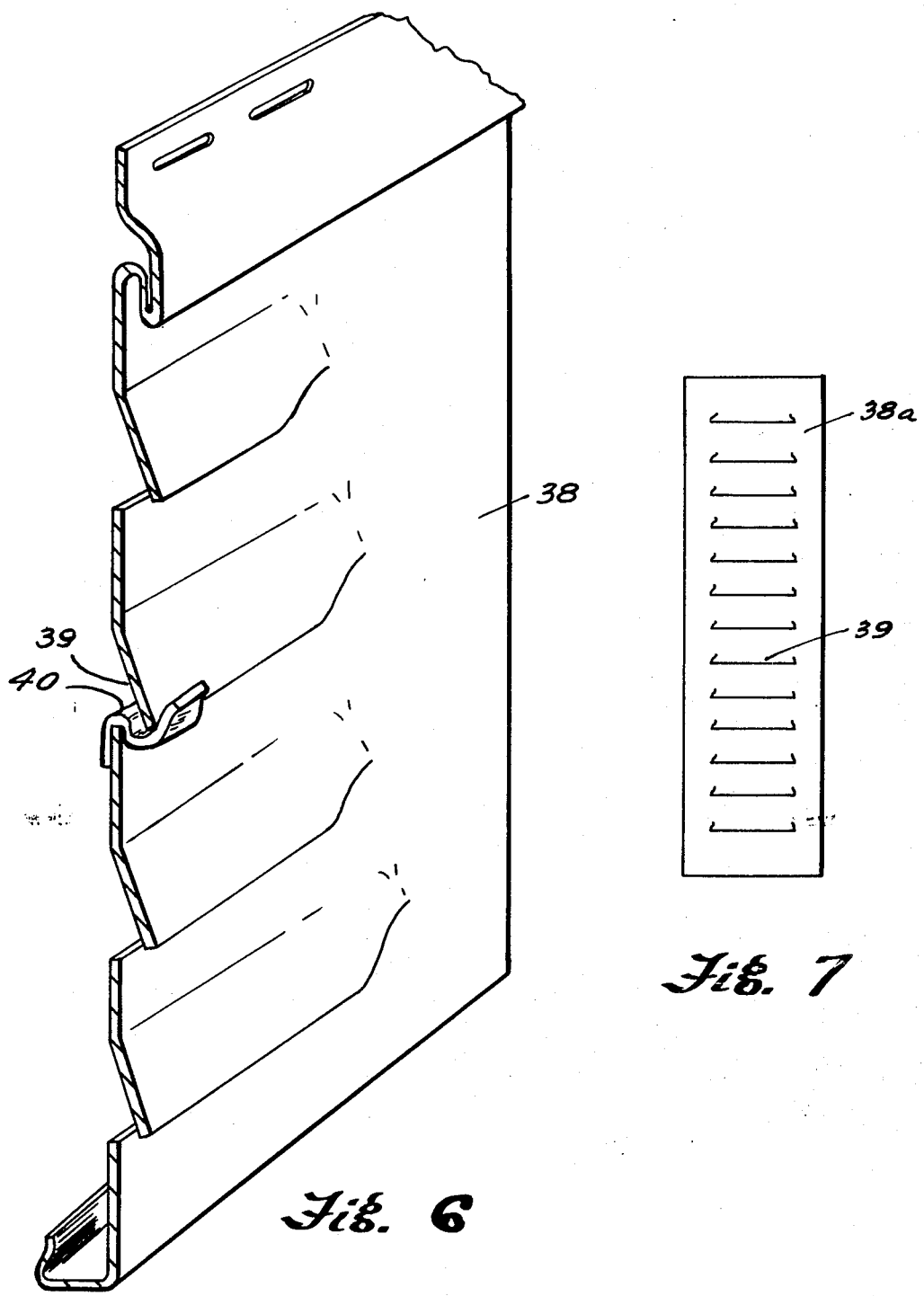

3,117,022
PRESS DEVICE
Edward M. du Bois, 5054 Pensacola Blvd.,
Dayton, Ohio 45439
Filed Mar. 7, 1972, Ser. No. 232,361
Int. Cl. B21j 9/04
U.S. Cl. 72—386          5 Claims

ABSTRACT OF THE DISCLOSURE

A press device for forming louvers includes a tool-carrying spindle and a die both of which are indexably mounted on a C-frame for forming in a panel a succession of louvers having their respective edges either parallel to or angularly disposed relative to the sides of the panel regardless of the length of the panel.

BACKGROUND

The present invention relates to material-forming operations and, more particularly, to an improved press device for effecting such operations either in the field or within a manufacturing plant.

Theretofore, various types of press devices such as punch presses and/or hydraulic presses and/or hand operated presses have been and are used in a wide variety of manufacturing operations such as piercing, slitting, shearing, punching, bending and the like. And such prior art devices are utilized in performing such operations on a wide variety of sheet-like and/or plate-like materials such as steel or other metallic materials, various types of plastic materials, paper and paperboard, leather and the like. Additionally, various types of means for indexably positioning one component relative to another are known.

However, insofar as I am aware, any and all of such previously known means and devices are subject to certain limitations which arise due to size and/or configuration of a workpiece. Accordingly, it is an object of the present invention to obviate such limitations and to provide an improved press device that is mechanically simple, relatively inexpensive and is portable and equally useful in the field as well as in a manufacturing plant.

SUMMARY

In accordance with one aspect of the invention, there is provided a tool-carrying spindle and a suitable die which are both indexable relative to the frame of the press and relative to each other thus enabling successive operations to be performed in more than one direction relative to the frame, thus avoiding restrictions which might otherwise be imposed due to configuration or length of a workpiece.

DESCRIPTION

These, as well as, additional objects and advantages will become apparent from the following description taken in connection with the accompanying drawings, in which:

FIG. 1 is a side elevational view of a press embodying the present invention;

FIG. 2 is an enlarged fragmentary portion of the embodiment of FIG. 1;

FIG. 6 is a sectional view of a completed workpiece having a plurality of louvers formed therein in accordance with the invention; and FIG. 7 is a plan view of a modification of the workpiece of FIG. 6.

Figure 3:
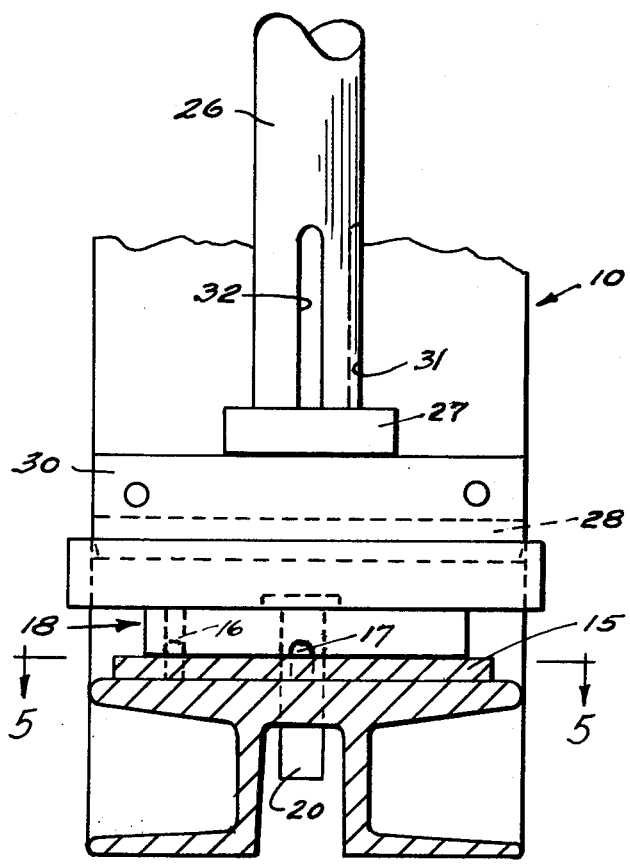
FIG. 3 is an enlarged front fragmentary portion of the embodiment of FIG. 1.
Figure 4:
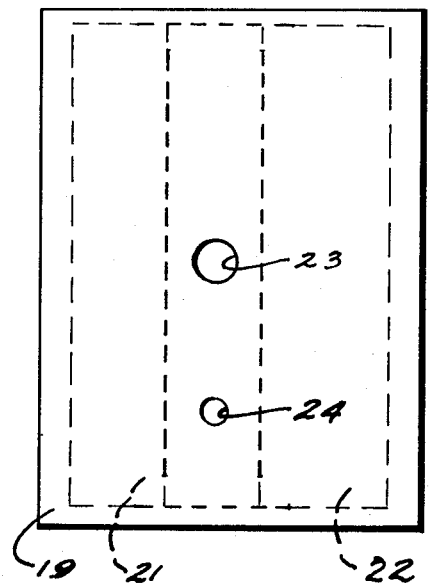
FIG. 4 is a bottom plan view of the die.

In the drawings and in the following description, reference is made to one aspect of the invention which includes a tool and a die suitable for forming a louver and/or a succession of louvers. It is to be understood that such reference is made solely for purposes of illustration and explanation and is not intended as a limitation since various changes and modifications may be made within the scope of the present invention.

Referring to the drawings, a device embodying the present invention includes a suitable frame 10 having a shape generally corresponding to the shape of the letter C. Frame 10 may include a handle 11 to facilitate transport of the device. Secured to the upper leg of the frame is an upstanding bracket 12 which provides a journal support for a shaft 13 having secured thereto a cam 14. A table member 15 is mounted on the upper side of the lower leg of frame 10 to provide support for a suitable die 18. As is best shown in FIG. 3, member 15 includes at least two pins or dowels 16, 17 fixed thereto, as well as a central opening, which facilitate accurate positioning of said die and a workpiece relative to a cutting, punching, or forming tool 30 in a manner to be described.

For example, die 18 may be intended for use in piercing and forming a plurality of identical and spaced-apart louvers in a panel member of formable material such as aluminum, steel, sheet plastic material and the like.

The die comprises a base 19 connected to a pair of spaced-apart blocks 21, 22 and having a central bore 23 for receiving a snug-fitting arbor 20 which is also snug-fitting received by a corresponding bore extending through the lower leg of frame 10 and through table member 15. Base 19 also has another bore 24 for snugly receiving one or the other of pins 16, 17.

At the outer extremity of the upper leg of frame 10 is a boss 25 in which spindle 26 is supported and mounted for reciprocable movement. A suitable spring (not shown) urges spindle 26 in an upward direction and thus maintains engagement of the upper end of the spindle with the surface of cam 14. The lower end of the spindle includes a head 27 to which may be connected a platen 28 including a resilient portion 29 and a tool 30, as is best shown in FIG. 2.

To prevent rotation thereof and insure that the spindle is maintained in one of two positions relative to frame 10, there are provided in spindle 26 a pair of keyways 31, 32 that are angularly spaced apart, and each of said keyways extends longitudinally along said spindle. As shown in FIGS. 1, 2, a pin 33 extends through boss 25 with the end of the pin snugly received in one of said keyways. Pin 33 is normally maintained in such relationship with the spindle and one of said keyways by the biasing influence of spring 34 and lever 35 which is pivotally connected at 36 to boss 25. The lower end of lever 35 is also connected to pin 31, thus enabling the pin to be withdrawn from the keyway when spring 34 is compressed by pushing against the upper end of lever 35.

Pin 33 may be selectively engaged and received in either one of keyways 31, 32. Spring 34 has a relatively soft stiffness which is merely sufficient to insure that pin 31 will be maintained in whichever keyway it may be positioned, and is not so stiff as to prevent reciprocation of the spindle relative to the pin. Thus, the spindle is free for reciprocable movement, but rotation relative to the frame is prevented when the pin 33 is received by one of the keyways 31, 32. Such reciprocable movement is effected by causing rotation of cam 14 as, for example, by manipulation of lever 37. The spacing between blocks 21, 22 may be varied as desired. As shown in FIG. 2, such spacing may correspond to the desired width of a louver 39 to be formed in a panel 38. Also, in accordance with the invention, parallelism of and uniformity of spacing between adjacent louvers is insured by making the width of block 22 correspond to the desired magnitude of said spacing.

Figure 5:
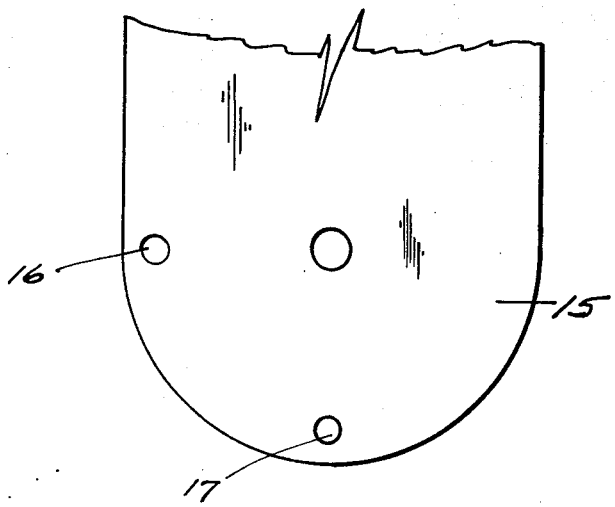
FIG. 5 is a fragmentary top plan view of the table.

As noted heretofore, pins 16, 17 are fixed to table 15. And, as best shown in FIG. 5, the pins are angularly spaced apart. Therefore, die 18 is selectively positionable relating to table 15 by lifting the die until base 19 is above the tops of pins 16, 17 and then rotating the die on arbor 20 until bore 24 is positioned to receive either pin 16 or pin 17.

In accordance with the invention, the angular displacement between pins 16 and 17 corresponds to the angular displacement between keyways 31, 32 of spindle 26, or a multiple or sub-multiple thereof. Thus, regardless of whichever pin is received by bore 24 of the die, there is a corresponding position of spindle 26 which will assure correct alignment of tool 30 relative to the die.

In operation, die 18 is selectively positioned with the space between blocks 21, 22 angularly disposed relative to the longitudinal axis of frame 10, or coincident with said axis, according to whether the work to be produced is similar to FIG. 6 or to FIG. 7. Spring 34 is compressed by manipulation of lever 35 to withdraw pin 33 from keyways 31 or 32, and the spindle 26 is then rotated to correctly align the tool 30 relative to the die and to bring the correct keyway into position for receiving pin 33. Lever 35 is then released, thereby permitting pin 33 to engage said correct keyway and and thereby maintaining correct alignment of tool 32 relative to die 18.

A workpiece 38 is then fed relative to the die in accordance with conventional feeding practice for successive cutting, slitting, punching, or forming operations performed by a suitable tool 30.

The invention provides several important features which are best shown in FIG. 2. For example, following the performance of a slitting operation by tool 30 and during the continued descent of spindle 31, the tool then binds the previously slit portion of the workpiece 38 and thereby forms a louver 39. While the spindle continues its descending movement, the resilient portion 29 engages the upper surface of workpiece 38 which is thereby urged and gripped against the upper surface of die block 22 during the final stages of formation of a louver 39. Such action insures that the louver and the non-louvered portions of the workpiece remain flat and undistorted with a sharp line of demarcation extending therebetween. Thus, it is desirable that the resilient portion 29 be made of an elastomeric material such as natural or synthetic rubber, neoprene, and the like. If the workpiece 38 is of certain materials such as the various plastics, it may be desirable to insert into the louver opening a spacer 40 made of metal or plastic to insure dimensional stability of the louver opening.

Another important feature of the invention resides in the provision of simple, inexpensive, and accurate means insuring uniformity of and desired magnitude of spacing between adjacent louvers 39. Still referring to FIG. 2, after the right-hand louver has been formed, the workpiece 38 is moved to the right beyond block 22. The workpiece is then moved back to the left until the downwardly projecting distal edge of the right-hand louver engages the side of die block 22, at which time the workpiece is in the correct position for the formation of an adjacent (left hand) louver. Thus, the spacing between adjacent louvers is uniform, and the magnitude of such spacing corresponds to the width of block 22. If it is desired to provide different spacing, it is merely necessary to replace block 22 with another block of desired width.

While a particular embodiment of the invention has been illustrated and described, it will be obvious that various changes and modifications may be made without departing from the invention, and it is intended in the appended claims to cover all such changes and modifications that fall within the true spirit and scope of the invention.

What is claimed is:

1. A press device for material-forming operations such as bending, shaping, piercing, cutting, punching and the like comprising a C-frame having first and second legs and a table portion connected to the distal end of said first leg, a spindle slidably mounted on said second leg for reciprocable movement toward and away from said table portion, and index means readily releasably-connecting said frame to said spindle and permitting rotational movement thereof relative to said frame when released but normally preventing such rotational movement without impeding said reciprocable movement when connected at one of a plurality of rotational positions of said spindle relative to said frame.

2. Device according to claim 1 wherein said indexing means includes a pair of spaced-apart keyways each extending parallel to the longitudinal axis of said spindle.

3. Device according to claim 1 and additionally including die means connected to said table portion at a location corresponding to said one rotational position.

4. Device according to claim 3 wherein said die means includes a block member having a workpiece-supporting surface and a workpiece-positioning surface angularly disposed relative to said supporting surface for accurately positioning a workpiece prior to effecting one of a succession of manufacturing operations.

5. Device according to claim 1 wherein said die means is indexably connected to said table for rotationally positioning said die means relative to said table at a plurality of locations at least one of which locations corresponds to said one rotational position of said spindle.

References Cited

UNITED STATES PATENTS

| | | | |
|---|---|---|---|
| 562,368 | 6/1896 | Barry | 72—445 |
| 852,443 | 5/1907 | Marbach | 83—552 |
| 1,544,393 | 6/1925 | Hatcher | 83—552 |
| 1,704,962 | 3/1929 | Bollaert | 83—552 |
| 1,926,985 | 9/1933 | Podrabsky | 83—552 |
| 2,748,864 | 6/1956 | Ewaldson | 83—552 |
| 3,052,279 | 9/1962 | Collin | 72—481 |

CHARLES W. LANHAM, Primary Examiner

G. P. CROSBY, Assistant Examiner

U.S. Cl. X.R.

72—446, 472; 83—552